(12) United States Patent
Kumar et al.

(10) Patent No.: US 9,511,436 B2
(45) Date of Patent: Dec. 6, 2016

(54) COMPOSITE COMPOSITION FOR TURBINE BLADE TIPS, RELATED ARTICLES, AND METHODS

(71) Applicant: General Electric Company, Schenectady, NY (US)

(72) Inventors: Sundeep Kumar, Bangalore (IN); Anand Krishnamurthy, Bangalore (IN); Kivilcim Onal, Greer, SC (US); Pazhayannur Ramanathan Subramanian, Niskayuna, NY (US); Dennis Michael Gray, Delanson, NY (US); Padmaja Parakala, Sydney (AU)

(73) Assignee: General Electric Company, Niskayuna, NY (US)

(*) Notice: Subject to any disclaimer, the term of this patent is extended or adjusted under 35 U.S.C. 154(b) by 274 days.

(21) Appl. No.: 14/075,156

(22) Filed: Nov. 8, 2013

(65) Prior Publication Data

US 2015/0132605 A1 May 14, 2015

(51) Int. Cl.
*B23K 1/00* (2006.01)
*C04B 35/117* (2006.01)
(Continued)

(52) U.S. Cl.
CPC ............. *B23K 1/0018* (2013.01); *B23K 1/012* (2013.01); *B32B 9/005* (2013.01); *B32B 9/041* (2013.01); *C04B 35/117* (2013.01); *C04B 35/46* (2013.01); *C04B 35/488* (2013.01); *C04B 35/495* (2013.01); *C04B 35/50* (2013.01); *C04B 35/505* (2013.01); *B23K 2203/08* (2013.01); *B32B 2307/554* (2013.01); *B32B 2307/714* (2013.01); *B32B 2311/22* (2013.01); *B32B 2603/00* (2013.01); *C04B 2235/40* (2013.01);
(Continued)

(58) Field of Classification Search
CPC .... B23K 1/0018; B23K 1/012; C04B 35/01; C04B 35/053; C04B 35/117; C04B 35/46; C04B 35/488; C04B 35/4885; C04B 35/495; C04B 35/50; C04B 35/505; B32B 9/005; B32B 9/041; B32B 2311/22
See application file for complete search history.

(56) References Cited

U.S. PATENT DOCUMENTS 4,169,020 A 9/1979 Stalker et al.
4,280,975 A 7/1981 Ammann
(Continued)

FOREIGN PATENT DOCUMENTS

WO 2005056879 A1 6/2005

OTHER PUBLICATIONS

Xie et al., "Epitaxial MCrAlY coating on a Ni-base superalloy produced by electrospark deposition", Surface and Coatings Technology, vol. 201, Issue 6, pp. 3564-3570, Dec. 4, 2006.
(Continued)

*Primary Examiner* — Jonathan Langman
(74) *Attorney, Agent, or Firm* — Francis T. Coppa

(57) ABSTRACT

A composite composition that includes an MCrAlX alloy and a nano-oxide ceramic is disclosed. In the formula, M includes nickel, cobalt, iron, or a combination thereof, and X includes yttrium, hafnium, or a combination thereof, from about 0.001 percent to about 2 percent by weight of the alloy. The amount of the nano-oxide ceramic is greater than about 40 percent, by volume of the composition. A protective covering that includes the composite composition is also disclosed. The protective covering can be attached to a tip portion of a blade with a braze material. A method for joining a protective covering to a tip portion of a blade, and a method for repair of a blade, are also provided.

12 Claims, 1 Drawing Sheet

(51) Int. Cl.
*C04B 35/46* (2006.01)
*C04B 35/488* (2006.01)
*C04B 35/495* (2006.01)
*C04B 35/50* (2006.01)
*C04B 35/505* (2006.01)
*B23K 1/012* (2006.01)
*B32B 9/00* (2006.01)
*B32B 9/04* (2006.01)

(52) U.S. Cl.
CPC .... *C04B2235/402* (2013.01); *C04B 2235/404* (2013.01); *C04B 2235/405* (2013.01); *C04B 2235/428* (2013.01); *C04B 2235/781* (2013.01); *C04B 2235/783* (2013.01); *Y10T 428/12493* (2015.01); *Y10T 428/12944* (2015.01); *Y10T 428/26* (2015.01); *Y10T 428/31678* (2015.04)

(56) References Cited

U.S. PATENT DOCUMENTS

| | | | |
|---|---|---|---|
| 4,540,336 A | 9/1985 | Cawley | |
| 5,704,759 A | 1/1998 | Draskovich et al. | |
| 5,863,668 A * | 1/1999 | Brindley | C23C 4/02 416/241 B |
| 5,952,110 A | 9/1999 | Schell et al. | |
| 6,194,086 B1 | 2/2001 | Nenov et al. | |
| 6,361,878 B2 * | 3/2002 | Ritter | 416/241 B |
| 6,793,706 B1 | 9/2004 | Hebsur | |
| 6,908,288 B2 | 6/2005 | Jackson et al. | |
| 6,916,529 B2 * | 7/2005 | Pabla | C23C 4/02 416/241 R |
| 7,473,072 B2 | 1/2009 | Malak et al. | |
| 7,510,370 B2 | 3/2009 | Strangman et al. | |
| 7,867,628 B2 | 1/2011 | Ozbaysal | |
| 8,168,289 B2 | 5/2012 | Seth et al. | |
| 2004/0067317 A1 | 4/2004 | Gorman | |
| 2008/0286108 A1 | 11/2008 | Lui et al. | |
| 2010/0021716 A1 | 1/2010 | Strock et al. | |
| 2010/0038412 A1 * | 2/2010 | Huang | B23K 35/3033 228/262.9 |
| 2012/0063911 A1 | 3/2012 | Bossmann et al. | |
| 2012/0251777 A1 | 10/2012 | Duval et al. | |
| 2012/0321905 A1 | 12/2012 | Schmitz et al. | |

OTHER PUBLICATIONS

Agrawal., "Microwave Sintering, Brazing and Melting of Metallic Materials", Sohn international symposium; advanced processing of metals and materials, TMS (The Minerals, Metals & Materials Society), pp. 183-192, vol. 4, 2006.

Kuo et al., "Functionally gradient (YSZ-20% Al2O3)—SUS422 composite", Metals and Materials International, vol. 14, Issue 4, pp. 411-417, Aug. 2008.

Rajendran., "Gas turbine coatings—An overview", Engineering Failure Analysis, vol. 26, pp. 355-369, Dec. 2012.

Xie et al., "A feasibility study of preparing MCrAlX/BN composite coatings by electrospark deposition process", Journal of Alloys and Compounds 484, pp. 21-24, 2009.

Kivilcim Onal et al., "Alloys for Bond Coatings and Articles Incorporating the Same", U.S. Appl. No. 13/292,382, filed Nov. 9, 2011, 19 Pages.

Kivilcim Onal et al., "Nickel-Cobalt-Based Alloy and Bond Coat and Bond Coated Articles Incorporating the Same", U.S. Appl. No. 13/330,090, filed Dec. 19, 2011, 24 Pages.

* cited by examiner

US 9,511,436 B2

COMPOSITE COMPOSITION FOR TURBINE BLADE TIPS, RELATED ARTICLES, AND METHODS

BACKGROUND OF THE INVENTION

This invention relates generally to composite compositions suitable for high pressure and elevated temperature environments. More particularly, the invention relates to composite compositions for abrasive tips of turbine blades, and methods for joining the abrasive tips to the turbine blades.

Typically, gas turbine engines are comprised of three major sections or components which function together to produce thrust for propulsion, or energy for generating power. The compressed air from the compressor section is delivered to a combustion section where fuel is added to the air and ignited, and thereafter delivered to the turbine section of the engine, where a portion of the energy generated by the combustion process is extracted by a turbine to drive the engine compressor.

Each turbine section includes a rotor assembly comprising a plurality of rotor blades, each extending radially outward from a disk across the airflow path. More specifically, each rotor blade has a dovetail which engages with the disk, and an airfoil extending radially from the disk to a blade tip at the opposite end. In the initial sections of the engine, the compressor blades are generally made of titanium alloys, or a martensitic stainless steel. In the later sections, the high pressure turbine blades are generally made of ferrous or nickel base alloys.

A shroud encompasses the blade tips with as little radial gap (clearance) as possible, in order to minimize bypass flow of air or other gases past the tips of the blades. The purpose of the narrow gap is to minimize gas leakage and to allow the pressure of the gas to increase from one section or stage to the next. A narrower gap (or reduced clearance) between the tips and the adjacent shroud usually increases the engine efficiency and power output of the engine. For example, every 10 mil decrease in the clearance in the hot gas path can significantly improve the power output of the turbine engines.

The minimization of the gap is often limited by several factors, for example, manufacturing tolerances, differing rates of thermal expansion, mass inertia effect, and dynamic effects. If the gap is too narrow, there is the possibility of undesirable contact (e.g., rubbing) between the tip and the shroud. In these cases, the blade can heat up faster than the surrounding shroud, and thus come into contact with the shroud, due to thermal expansion and mass inertia differentials. There are likely other mechanisms (e.g., deformation, oxidation) that also cause this contact (e.g., rubbing), and in turn, damage or unduly wear the blade tips. For example, the inner diameter of the shroud is not usually concentric with the axis of rotation of the blades, and the blade tips can rub the surrounding shroud. Damage to the blade tips leads to widening the gap between the blade tip and the surrounding shroud, and allowing the gas to leak through, which can, in turn, degrade the efficiency of the turbine. Severe damage can even lead to cracking of the blade and possible blade failure.

Several approaches have been proposed to address the problem of the blade tip damage and air leakage within the gas-flow path. One approach is to apply a clearance sealing layer on the inner diameter of the shroud, so that the sealing layer can be abraded away by the blade tip, as disclosed in U.S. Pat. Nos. 4,540,336 and 4,280,975 or 5,704,759.

Another approach is to incorporate a cutting edge ("squealer tip") at the blade tip. As an example, a cutting edge of a blade tip typically includes an abrasive tip coating. As disclosed in U.S. Pat. Nos. 5,704,759 and 4,169,020, commonly used abrasive tips or tip coatings often entailed abrasive particles dispersed in a metallic matrix.

Much emphasis has been placed on developing suitable combinations of metal matrix materials with abrasive particles, as well as methods for their manufacture. Suitable metal matrix materials must exhibit acceptable environmental resistance (e.g., oxidation and hot corrosion resistance) to the operating temperature of a gas turbine engine. Various materials have been proposed, including nickel-base alloys (e.g, NiCoCrAlY) dispersed with an abrasive material such as nitrides (e.g., cubic boron nitride), carbides, and oxides. Furthermore, a variety of methods, such as spraying, soldering, electroplating etc, have been proposed to provide the tip coatings on the blade. However, currently used tips or tip coatings have several issues, for example, depletion of elements such as aluminum and chromium, spallation of the coatings, fatigue or other defects, and hydrogen embrittlement (usually in case of electroplated tips).

Therefore, there is a need for a material for a blade tip, and a blade tip thereof with improved characteristics to meet performance requirements for turbine applications. In some preferred embodiments, manufacturing the tip should be less complicated and less expensive than existing tip coating methods.

BRIEF DESCRIPTION OF THE INVENTION

One embodiment of the invention is directed to a composite composition that comprises an MCrAlX alloy and a nano-oxide ceramic. For the MCrAlX alloy, M includes nickel, cobalt, iron, or a combination thereof, and X may include yttrium, hafnium, or a combination thereof, from about 0.001 percent to about 2 percent by weight of the alloy. The amount of the nano-oxide ceramic is greater than about 40 percent, by volume, of the composition. In one embodiment, a protective covering comprising the composite composition is provided. The protective covering is disposed on a tip portion of a blade with a braze material. The blade may be a turbine blade generally used in the engines.

Another embodiment of the invention is directed to a method for joining a protective covering to a tip portion of a blade. The protective covering includes the composite composition set out above, and further described below. The method includes the steps of disposing a braze material between a surface of a protective covering and a tip portion of the blade, and joining the protective covering to the tip portion by heating the braze material to form a braze joint between the protective covering and the tip portion.

Yet another embodiment is directed to a method for repair of a blade. The method includes the steps of removing a portion of a worn or damaged tip of the blade, and then providing a protective covering on a tip portion of the blade, such that the protective covering replaces at least the removed portion of the tip of the blade. The protective covering is joined to the tip portion of the blade with a braze material. The braze material is disposed between a surface of the protective covering and a tip portion of a turbine blade, and heated to form a braze joint.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
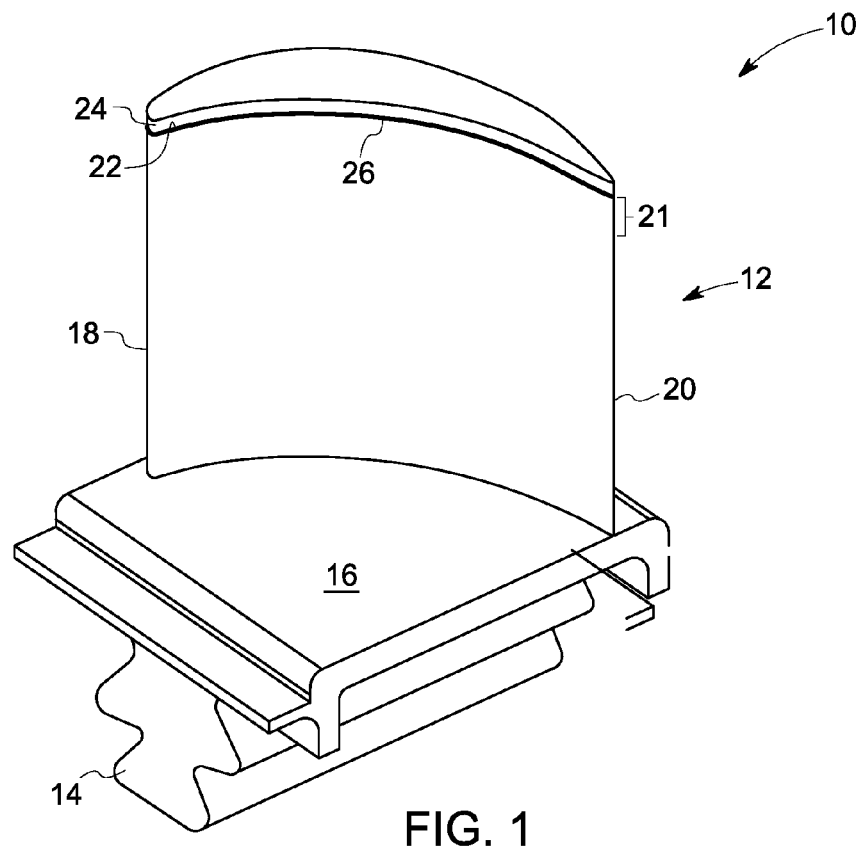
FIG. 1 is a schematic, cross-sectional view of a blade, in accordance with some embodiments of the invention.

The present invention provides a composite composition and an improved protective tip covering (e.g., blade tips) for turbine blades thereof. As discussed in detail below, some of the embodiments of the present invention provide a composite composition for a protective covering and a method for joining the protective covering (which may also be referred to as "protective cap") to a tip portion of the blade, and a blade thereof. The invention further includes embodiments that relate to a method for repair of the blades. During service of the blade, a worn or damaged tip of the blade can be replaced by a new coating or a tip. These embodiments advantageously provide an improved blade tip to address problems of tip damage and leakage from the gas flow path. Though the present discussion provides examples in the context of blade tips for a turbine rotor, these processes can be applied to any other component, for example, blades in other sections of the turbine.

Quite generally, in the interest of brevity of the discussions herein, a protective coating or a protective covering or a protective cap comprising a composite composition and applied/disposed on a tip portion of a blade may be referred to as a "tip" or "abrasive tip" or "composite tip" of the blade.

Approximating language, as used herein throughout the specification and claims, may be applied to modify any quantitative representation that could permissibly vary, without resulting in a change in the basic function to which it is related. Accordingly, a value modified by a term or terms, such as "about," is not limited to the precise value specified. In some instances, the approximating language may correspond to the precision of an instrument for measuring the value.

In the following specification and claims, the singular forms "a", "an" and "the" include plural referents unless the context clearly dictates otherwise. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

The terms "comprising," "including," and "having" are intended to be inclusive, and mean that there may be additional elements other than the listed elements. As used herein, the term "and/or" includes any and all combinations of one or more of the associated listed items. Unless otherwise indicated herein, the terms "disposed on", or "disposed between" refer to both direct contact between components, objects, layers, and the like, or indirect contact, e.g., having intervening layers therebetween.

In some embodiments, a composite composition (which may also be referred to as a composite material) includes a MCrAlX alloy and a nano-oxide ceramic. In the MCrAlX alloy, M may include nickel, cobalt, iron, or a combination thereof, Cr is Chromium, Al is Aluminum, and X may include yttrium, hafnium, or a combination thereof; from about 0.001 percent to about 2 percent by weight of the alloy. The MCrAlX alloy is an oxidation-resistant and hot corrosion-resistant material which provides toughness to the composite composition, and provides mechanical support to the oxide ceramic. The ceramic includes nano-sized particles of an oxide. As used herein, a nano-oxide ceramic may also be referred to as "nano oxide" or "nano ceramic", or "oxide ceramic."

In some specific embodiments, X includes yttrium. MCrAlY alloys (one type of the "MCrAlX" alloys) are a family of high temperature materials generally used for protective coatings, wherein M is selected from one or a combination of iron, nickel and cobalt; Cr is chromium, Al is aluminum, and Y is yttrium. These MCrAlY coatings often include gamma and beta phases in the alloy microstructures. Various alloying elements, such as Si, Hf, Pd and Pt, are typically added to gamma/beta MCrAlY alloys to improve oxidation and/or hot corrosion resistance, but this may lead to a reduction in strain tolerance, and a reduction of the spallation life of the coating systems in which they have been employed.

In some embodiments, the MCrAlX alloys employ reduced amounts of X, as compared to existing MCrAlX alloys often used for turbine engine applications. In these embodiments, X ranges from about 0.001 to about 2 percent, and more specifically, from about 0.001 to about 1 percent by weight of the alloy. In some embodiment, X may be even lower, for example from about 0.001 percent to about 0.2 percent, and more specifically, from about 0.02 to about 0.15 percent by weight of the alloy. The reduced amounts of X, particularly yttrium (Y) in MCrAlY alloys, advantageously provide an improved oxidation resistance and increased spallation resistance for these alloys when used in protection systems (e.g., protective coatings or coverings). The MCrAlX alloys disclosed herein also may employ increased amounts of aluminum as compared to existing MCrAlY alloys, which advantageously further improves the oxidation resistance as compared to existing MCrAlY alloys.

The MCrAlX alloys also may optionally employ germanium, which also advantageously improves the ability to retain a beta phase for longer exposure times in turbine engine applications. The MCrAlX alloys may optionally employ silicon also, which advantageously improves the oxidation resistance and spallation life. However, in other cases, depending on particular end use situations, the MCrAlX alloys include substantially no silicon, so as to prevent the possibility of the formation of brittle $Ti_xSi_y$ phases when used with materials that include Ti and improve strain tolerance. There MCrAlX alloys are described in detail in patent application Ser. Nos. 13/292,382 and 13/330,090, filed on Nov. 9, 2011, and Dec. 19, 2011, respectively, which are incorporated herein by reference.

The MCrAlX alloy may optionally include germanium, as mentioned above, in an amount, by weight of the alloy, of up to about 1.5 percent, and more particularly from about 0.01 to about 1.5 percent, and even more particularly, from about 0.2 to about 1.5 percent. As mentioned above, in some situations, the MCrAlX alloy may optionally include silicon in an amount, by weight of the alloy, of up to about 1.5 percent, and more particularly from about 0.01 to about 1.2 percent, and even more particularly, from about 0.1 to about 1.0 percent.

In some embodiments, the MCrAlX alloy may be a cobalt-based alloy, cobalt-nickel based or nickel-cobaltbased alloy. In some instances, these alloys may have a microstructure that includes gamma and beta phases as mentioned above. Some of these embodiments include MCrAlX alloys wherein, by weight of the alloy, M comprises cobalt in an amount of at least about 27 percent, and X comprises yttrium in an amount of about 0.001 to less than about 0.19 percent, by weight of the alloy. In some embodiments, yttrium may be present in an amount, by weight of the alloy, from about 0.001 to about 0.18 percent, and more particularly, from about 0.01 to about 0.18 percent, and even more particularly from about 0.02 to about 0.15 percent. In some other exemplary embodiments, the MCrAlX alloy may be a cobalt-nickel-based alloy, that includes by weight of the alloy, from about 20 to about 82 percent nickel, from about 10 to about 28 percent chromium, from about 5 to about 15 percent aluminum, from about 0.001 percent to about 0.19 percent yttrium, and optionally includes germanium and/or silicon, and the balance cobalt.

In some exemplary embodiments, the alloy may be a nickel-based alloy. The MCrAlX alloy can have a microstructure that includes gamma and gamma prime phases. In some embodiments, M comprises nickel in an amount of at least about 30 percent, and X comprises from about 0.005 percent to about 0.19 percent yttrium. In some other exemplary embodiments, the MCrAlX alloy comprises a nickel-cobalt-based (NiCoCrAlX) alloy, having a microstructure that includes gamma and gamma prime phases wherein, by weight of the alloy, M comprises nickel in an amount of at least about 30 percent, and cobalt in an amount from about 5.0 percent to about 15.0 percent, and X comprises yttrium in an amount from about 0.005 percent to about 0.19 percent. The MCrAlX alloy may also include germanium in an amount, by weight of the alloy, up to about 1.25 percent.

The incidental impurities may include those incidental to the processing of the individual alloy constituents described herein, particularly those known to be incidental to cobalt-based or nickel-based superalloys, comprising these constituents, and more particularly, to cobalt-nickel-based or nickel-cobalt-based alloys comprising these constituents. An example of an incidental impurity is sulfur. The amount of sulfur will preferably be controlled to less than about 100 ppm by weight of the alloy.

The MCrAlX alloys may be formed by any suitable method, including various vacuum melting methods, and particularly, melting methods employed for various superalloys, particularly cobalt-based, cobalt-nickel-based, nickel-based or nickel-cobalt-based superalloys.

As discussed previously, the composite composition further includes a nano-oxide ceramic. A ceramic is required as an abrasive constituent in the composite material. An oxide ceramic may be suitable because of several properties, such as high stability in an oxidizing and corrosive environment, high chemical stability, and hardness. The oxide ceramic may be present in an amount more than about 40 percent, by weight of the composite. In some embodiments, the level is from about 50 percent to about 95 percent, and more particularly, from about 70 percent to about 90 percent.

The particle size distribution of the oxide may be important, and may affect the composite material and resulting protective covering thereof. It is desirable to have nano-sized particles of the oxide, to avoid cracks in the resulting covering. A fine ceramic does not crack easily. Moreover, the MCrAlX alloy matrix and the nano-oxide particles in the composite material are interspersed in such a way that cracks generated in the oxide cannot propagate across the covering. The resulting composite material has high strength, high wear resistance, and high hardness.

In some embodiments, the oxide ceramic may have a substantially uniform particle size distribution, e.g., comprising substantially all fine particles of a particle size less than about 200 nanometers. The nano-oxide may be an especially fine material, e.g., having an average particle size of about 5 nanometers. In some embodiments, the average particle size may be between about 5 nanometers and about 100 nanometers, and even between about 10 nanometers and 50 nanometers. However, in other embodiments, the particle size distribution may be bimodal. The nano-oxide may include fine particles and coarse particles. The coarse particles may be about 100 microns to about 300 microns in size. These coarse particles are abrasive in nature, and capable of producing cuts into the counterface (e.g., shroud), which is desirable in some instances. Other abrasive particles may also be added to the composite composition. One particular example of the abrasive material may be cubic boron nitride (CBN). The CBN may have an average particle diameter ranging between about 25 microns and about 300 microns. Some other abrasive materials may include silicon carbide, silicon nitride, silicon oxynitride, cubic zirconia, yttria, and yttrium aluminum garnet. In some instances, these abrasive particles may be oxide (e.g., yttria) coated.

Suitable oxides for the nano-oxide ceramic may include alumina, hafnia, titania, zirconia, tantala, terbia, ytterbia, dyprosia or a combination thereof. In some specific embodiments, the composite composition includes nano-alumina. As used herein, nano-alumina includes alumina particles in the nanometer range. For example, an average particle size of nano-alumina may be between about 5 nanometers and about 200 nanometers. In some instances, the average particle size may be between about 10 nanometers and about 100 nanometers. The nano-alumina may be acquired commercially, or a coarse alumina powder can be milled to achieve nano-size particles.

Some embodiments of the invention provide a protective covering including the composite composition as described above. In one embodiment, the protective covering is formed of the composite composition. The protective covering is disposed on a tip portion of a blade. The blade may be a turbine blade, for example. In some key embodiments, the protective covering is bonded to the tip portion by a braze material. The braze material includes from about 1 weight percent to about 10 weight percent of an active metal element, based on the total amount of the braze material.

FIG. 1 schematically represents a blade 10. The blade 10 is exemplary of the type of turbine blades that are used in an industrial or aircraft turbine engine. The blade 10 includes a blade portion or an airfoil 12 that includes a concave face and a convex face. The concave face of the airfoil 12 acts against the flow of hot combustion gases during the operation, and provides the driving force to the turbine engine. The blade 10 is usually mounted on a disk in a rotor (not shown) by a dovetail 14 which extends downwardly from the airfoil 12, and engages a slot on the disk. The rotor may be an integral bladed disk, or a disk with inserted blades. A platform 16 extends longitudinally outwardly from the area where the airfoil 12 is joined to the dovetail 14. The airfoil 12 includes a leading edge 18 and a trailing edge 20. The airfoil further includes a tip portion 21, having a tip edge 22 remote from the platform 16.

The airfoil 12 is usually relatively thin, as measured in a transverse direction (i.e. perpendicular to the platform). The dovetail 14 is usually relatively thick, as measured perpendicular to its direction of elongation.

A single blade 10 of the turbine section (not shown) of an engine is depicted, though it should be understood that the blade 10 is one of a number of blades in a turbine rotor. The number of blades may have a substantially different shape and size, depending on many gas turbine engine models or applications. Typically, multiple blades are attached to the rotor disk in adjacent circumferential positions. As mentioned previously, these blades are often circumscribed by a case (e.g., a shroud), a portion of which is typically positioned in close proximity to the radially outermost tip portions (e.g., tip edges 22) of the blades (U.S. Pat. No. 5,059,095 and U.S. Publication 2012/0134786). A small gap is usually present between the blade tip and the case. Minimizing the gap promotes the efficiency of the turbine section and the engine thereof.

The turbine blades are typically made from advanced superalloys such as IN713, IN738, IN792, MarM247, GTD111, Rene142, ReneN5, SC180, and CMSX4, to name several non-exclusive examples.

Typically, a protective coating system is used over a blade to provide protection from high temperatures and corrosive environments. These protective coatings usually include a thermal barrier coating (TBC) layer (e.g., a ceramic material such as yttria-stabilized zirconia overlaid on MCrAlY bond coat), an aluminide (or similar) coating layer, or a combination thereof. In some embodiments, the tip edge 22 may include one or more thermal barrier coating layers, or one or more aluminide coating layers, or a combination thereof.

Referring to FIG. 1 again, the blade 10 includes a protective covering 24 at the edge 22 of the tip portion 21. The protective covering 24 forms the outer radial extremity of the blade 10. The protective covering 24 incorporates the composite composition (as discussed previously) that can assist in preventing or at least minimizing abrasion between the tip 22 and the case (or shroud), and thus prevents/reduces degradation of the blade. Furthermore, the protective covering 24 may also serve to promote flow path sealing with the case, by creating a more tortuous flow path between the blade tip edge 22 and the case.

The protective covering 24, as used herein, is depicted in very general form in the figures, for simplicity. In one embodiment, the covering 24 is meant to be a sintered component, in a form of a preform, a sheet, a wire, or a wafer that is capable of covering the tip edge 22 of the blade, in order to protect the edge from rubbing. The covering 24 includes the composite composition as discussed above, and may be joined/bonded to the tip portion at the edge 22. In one embodiment, the protective covering 24 includes a monolith of a suitable composite material. The material for the protective covering 24 may be prepared by compacting the powder by mechanical means, casting, extrusion, molding, or additive manufacturing, followed by sintering (heat treatment). The sintered protective covering can sometimes be machined into a desired shape and/or size.

In one embodiment, the sintered protective covering may be a free-standing component with high mechanical strength. A high mechanical strength value can be attributed to a high density of the component. Table 1 shows percentages of measured densities for some exemplary samples of composite compositions with respect to their theoretical densities. Details of these samples are explained below under example section. A low density (usually lower than 85% of the theoretical density) indicates a mechanically weak component that can break on handling or during operation. A density, as high as 100% (i.e., theoretical density) may be desirable. However, a density level of higher than about 95% often ensures high mechanical strength for a component.

According to one embodiment of the invention, the sintered protective covering has a density of at least about 85% of the theoretical density. In some embodiments, the density of the sintered protective covering may range between about 88% of the theoretical density and about 99% of the theoretical density, and in some specific embodiments, between about 90% of the theoretical density and about 98% of the theoretical density.

In one embodiment, the protective covering 24 may be in the form of a coating of the composite composition. The coating may be applied by vapor deposition, slurry deposition, or any thermal spray process, including but not limited to, high velocity oxygen fuel spraying (HVOF), high velocity air fuel spraying (HVAF), vacuum plasma spray (VPS), air plasma spray (APS), ion plasma deposition (IPD), electron-beam physical vapor deposition (EBPVD) and cold spray methods.

The geometric profile of the protective covering 24 may be in conformance with the blade edge on which it needs to be adhered to. In other words, the protective covering 24 may be of a desired shape and size to cover the tip edge 22 of the blade, to prevent damage of the tip portion. In specific instances, the length and width of the protective covering 24 may be substantially equal to the length and width of the tip edge 22 of the blade 10. The covering 24 may be plane or curved in shape, with or without angles or rounding, in order to fit the shape of the tip edge 22. The thickness of the covering 24 (or height of the abrasive tip) may range from about 50 microns to about 1000 microns. In some specific embodiments, the thickness of the covering 24 may range between about 200 microns to about 500 microns.

The shape and size of several components discussed above with reference to FIG. 1 are only illustrative for the understanding of the blade structure; and are not meant to limit the scope of the invention. The exact shape, size, and position of components (e.g., the protective covering 24) can vary to some degree.

Figure 2:
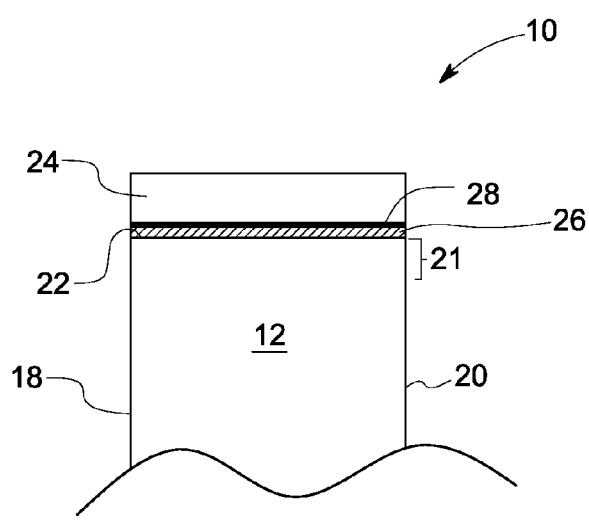
FIG. 2 is a schematic, cross-sectional exploded view of a portion of a blade, in accordance with some embodiments of the invention.

As alluded to previously, the protective covering 24 may be bonded to the tip portion 21 at the edge 22 by a braze joint or bond 26, as illustrated in FIG. 2. The braze joint 26 is formed by using a braze material that includes an active metal element. An "active metal element", as used herein, refers to a reactive metal that has a high affinity to oxygen, and thereby reacts with the ceramic. A braze material or alloy containing an active metal element can also be referred to as an "active braze alloy", and the corresponding technique may be referred to as "active brazing." Active brazing is a technique used to join a ceramic to a metal, or a ceramic to a ceramic. The active metal element undergoes a reaction with the ceramic, when the braze alloy is in a molten state, and leads to the formation of a thin reaction layer on the interface of the ceramic and the braze alloy. The thin reaction layer allows the braze alloy to wet the ceramic surface, resulting in the formation of a ceramic-ceramic or a ceramic-metal joint/bond, which may also be referred to as an "active braze joint or seal."

In some embodiments, the braze material includes a nickel-based alloy. In general, the amount of nickel balances the alloy based on the amounts of the other constituents. As discussed previously, the braze alloy includes an active metal element. A variety of suitable active metal elements may be used to form the active braze alloy. The selection of a suitable active metal element mainly depends on the chemical reaction with the ceramic (e.g., nano-alumina) to form a uniform and continuous reaction layer, and the capability of the active metal element of forming an alloy with a base element (e.g. nickel). The active metal element for embodiments herein is often titanium. Other suitable examples of the active metal element include, but are not limited to, zirconium, hafnium, and vanadium. A combination of two or more active metal elements may also be used.

The presence and the amount of the active metal may influence the thickness and the quality of the thin reaction layer, which contributes to the wettability or flowability of the braze alloy, and therefore, the bond strength of the resulting joint. A high amount (for example, greater than about 20 weight percent) of the active metal element like titanium in a braze alloy has been thought to be technically undesirable, due to the formation of brittle compounds with several alloying elements present in the blade alloy. The formation of these brittle compounds may initiate cracks at the braze joint. However, it was observed that a small amount (for example, less than about 10 weight percent) of the active metal element is generally suitable for improving the wetting of the ceramic surface (e.g., the protective covering 24), and forming the thin reaction layer (e.g., less than about 10 microns) to form a bond with the composite covering (e.g., the alumina containing composite). In some embodiments, the active metal element is present in an amount ranging from about 0.1 weight percent to about 10 weight percent, based on the total weight of the braze alloy. A suitable range is often from about 1 weight percent to about 6 weight percent.

The braze alloy composition may further include at least one additional element. The additional element may provide adjustments in several required properties of the braze alloy, for example, the coefficient of thermal expansion, liquidus temperature, brazing temperature, corrosion resistance, and the strength of the braze alloy. In one embodiment, the additional element can include, but is not limited to, chromium, cobalt, aluminum, tin, zinc, molybdenum, germanium, silicon, or a combination thereof. With respect to the amount, the braze alloy includes up to about 10 weight percent (e.g., about 0.1%-10%) of the additional elements, based on the total weight of the braze alloy. In some embodiments, the braze alloy includes from about 0.1 weight percent to about 2 weight percent of molybdenum, based on the total weight of the braze alloy. Some examples of the braze alloy may include Ni-10Ti, and Ni-6Ti.

Some embodiments provide a method for joining a protective covering to a blade tip. The method includes the steps of introducing the braze alloy between the protective covering and the blade tip to form a brazing structure. (The braze alloy could be deposited on one or both of the mating surfaces, for example, as also described below). The brazing structure can then be heated to form an active braze joint or seal between the protective covering and the blade tip. In one embodiment, the protective covering includes a ceramic; and the blade includes a metal. The braze alloy composition includes nickel and an active metal element. At least one additional alloying element, such as chromium, cobalt, aluminum, tin, zinc, molybdenum, copper, germanium, silicon, or a combination thereof, may further be added.

For joining the protective covering 24 to the blade tip 22, the braze alloy may be introduced between them. For example, referring to FIG. 2, the braze alloy may be disposed between the blade tip edge 22 and the covering 24. In some instances, a layer of the braze alloy may be applied on the tip edge 22, a surface of the covering 24, or both of the surfaces being joined. The thickness of the alloy layer may be in a range between about 5 microns and about 100 microns, and in some specific embodiments, between about 15 microns and about 50 microns. The layer may be deposited or applied on one or both of the surfaces to be joined, by any suitable technique, e.g. by a printing process or other dispensing processes. In some instances, a foil, a sheet, wire, or a preform may be suitably positioned for bonding the surfaces to be joined.

The method further includes the step of heating the brazing structure. The entire assembly (or a brazing structure) is usually heated at a suitable brazing temperature. On heating, the braze alloy melts and flows over the surfaces. The brazing temperature will depend in large part on the materials involved in this step. It is generally less than the melting temperatures of the components to be joined, and higher than the liquidus temperature of the braze alloy. In some instances, the brazing temperature may be between about 1000 degrees Celsius and about 1600 degrees Celsius, and more specifically between about 1200 degrees Celsius and about 1500 degrees Celsius.

The heating step during brazing can be undertaken in a controlled atmosphere, such as ultra-high pure argon, hydrogen and argon, ultra-high pure helium; or in a vacuum. To achieve good flow and wetting of the surfaces, the assembly is often held at the brazing temperature for a few minutes after melting of the braze alloy. This period may be referred to as the "brazing time". During the process, a load can also be applied.

During brazing, the alloy melts and the active metal element (or elements) present in the melt reacts with the ceramic in the composite covering 24 and forms a thin reaction layer 28 at the interface of the protective covering 24 and the braze alloy (described previously), as illustrated in FIG. 2. The thickness of the reaction layer may range from about 0.1 micron to about 2 microns, depending on the amount of the active metal element available to react with the ceramic, and depending on the surface properties of the composite protective covering. In a typical sequence, the brazing structure is then subsequently cooled to room temperature; with the resulting active braze hermetic joint 26 situated between the two components. In some instances, rapid cooling of the brazing structure is permitted.

When articles such as several components of gas turbines are serviced, the protective coatings, and tip coverings or tip caps (or abrasive tips) are usually removed to permit inspection and possible repair of the tip caps and the underlying substrate, followed by re-coating the blade and the tip of the blade. Removal of the coatings and tip caps is typically carried out by immersing the component in a stripping solution. A variety of stripping techniques are currently available for removing different types of coatings from metal substrates. The techniques usually must exhibit a considerable amount of selectivity. In other words, they must remove only intended materials, while generally preserving the article's desired structures.

Some embodiments of this invention relate to a method for repair of a turbine blade. During repair, a worn or damaged tip of the blade can be removed, and replaced by a protective covering or cap applied over a tip portion of a blade (e.g, a turbine blade). The term, "replace" as used herein means that the protective covering occupies the region on the tip edge of the blade formally occupied by the removed portion, or at least a desired portion of the region, if full coverage is not needed in the repair. The first step of the method includes the removal of a portion of the worn or damaged tip of the blade. Any suitable method can be employed to remove the damaged tip. In some embodiments, an electrochemical method can be used for the removal of the damaged tip. The electrochemical treatment is usually followed by de-smutting and rinsing steps. The replacement (or new) protective covering can then be applied to the tip portion of the blade by the active brazing method, as previously discussed in detail. In one embodiment, a sintered protective covering may be joined to the tip portion of the blade.

Embodiments of the present invention provide composite compositions for the blade tips, which have high resistance to oxidation and hot corrosion. These blade tips may be advantageously joined to the blade by active brazing, which is a relatively inexpensive, simple, and rapid process, as compared to currently available methods. The resulting blade tips are very strong, reliable, and chemically stable in the corrosive environment. For example, the tensile strength of the active braze joint often ranges between about 100 Mpa and about 200 MPa for a ceramic-to-metal butt joint. Moreover, an additional advantage provided by active brazing is the ability to achieve the joint in single step, and thus to manufacture the blade tip in fewer steps, and simpler steps, as compared to conventional, multi-step manufacturing processes, which can sometimes be cumbersome.

In some embodiments, a turbine rotor comprises a plurality of blades. The plurality of blades is arranged circumferentially on the rotor. In some embodiments, every blade of the rotor includes the protective covering 24 (e.g., abrasive tip) (as discussed above). In some embodiments, a few (not all) blades include the abrasive tip (e.g., made of the composite composition), which are usually referred to as "cutter blades." The purpose of the cutter blade is to engage shroud material located on the inner surface of the casing, to further minimize any leakage around the blade tip. The cutter blade including the abrasive tip cuts the shroud material as the blade rotates, providing an incursion into the shroud material. The abrasive tip serves to wear-form a seal track in the shroud, resulting in a virtual seal between the blades and the shroud which prevents gases from bypassing the rotor assembly. The advantage of the cutter blade is that only a small number of the blades need to be given the composite protective covering, while the rest can be left bare. Thus, for some embodiments, the cost of disposing protective coverings on every blade, and related processing (tip grinding to the precise height and profile) can be avoided. Further, the cutter blades can be made deliberately taller than the rest of the blades, so that only the covered or capped cutter blades make substantial contact with the shroud material. By cutting into the shroud and creating a trench, the cutter blades protect the rest of the blades from rubbing, and reduce overall damage.

EXAMPLES

The examples that follow are merely illustrative, and should not be construed to be any sort of limitation on the scope of the claimed invention. Unless specified otherwise, all ingredients may be commercially available from such common chemical suppliers as Alpha Aesar, Inc. (Ward Hill, Mass.), Sigma Aldrich (St. Louis, Mo.), Spectrum Chemical Mfg. Corp. (Gardena, Calif.), and the like.

Example 1

3 samples (sintered bars) formed of composite compositions were prepared. For each sample, Table 1 shows compositional details of the composite compositions. Each composite composition contains NiCrAlY alloy having 1 weight percent of yttrium and nano-alumina of an average particle size of about 140 nanometers. The alloy powders and nano-alumina powders were weighed according to the desired composition for the 3 samples, and milled in high purity ethanol using zirconia media for about 12 hours. Milled powders of the three samples were then dried in an oven at about 90 degrees Celsius for about 6 hours. To ensure homogeneity of the compositions, the dried powders were ground using a pestle mortar. The grounded powders were pressed into bars of size (27 mm×11 mm×7 mm) using a uniaxial press (110 MPa), and the resulting bars were sintered in argon at about 1400 degrees Celsius for about 4 hours. The sintered bars were then characterized for the density measurement.

TABLE 1

| Samples | Composite composition (weight percent) | Theoretical Density (g/cc) | Measured Density (g/cc) | Percentage density of theoretical density |
|---|---|---|---|---|
| Sample 1 | 90 nano-alumina:10 NiCrAlY | 4.2 | 3.74 | 89.05 |
| Sample 2 | 80 nano-alumina:20 NiCrAlY | 4.45 | 3.91 | 87.87 |
| Sample 3 | 70 nano-alumina:30 NiCrAlY | 4.73 | 4.19 | 88.58 |

The density of the three samples was measured by using the Archimedes method, using water as solvent, and compared with a desired theoretical density of the respective composite composition. It is clear from Table 1 that the densities of the 3 samples are relatively moderate (based on the previous description), and the samples are mechanically strong at an acceptable level for many end uses. Furthermore, the density (and the mechanical strength) of a sintered composite component can be improved by using finer or bimodal nano-alumina, various pressing techniques, for example uniaxial hot-pressing, and by varying sintering process parameters such as sintering temperature and time.

While only certain features of the invention have been illustrated and described herein, many modifications and changes will occur to those skilled in the art. It is, therefore, to be understood that the appended claims are intended to cover all such modifications and changes as fall within the true spirit of the invention. Furthermore, all of the patents, patent applications, articles, and texts which are mentioned above are incorporated herein by reference.

The invention claimed is:

1. A protective covering comprising a composite composition bonded to a substrate with a braze material, wherein the composite composition comprises:
   a MCrAlX alloy, wherein M comprises nickel, cobalt, iron, or combinations thereof, and X comprises, by weight of the alloy, from about 0.001 percent to about 2 percent yttrium, hafnium, or a combination thereof;
   a nano-oxide ceramic in a range from about 70 percent to about 90 percent by volume of the composite composition; and wherein
   the braze material comprises a nickel-based alloy having from about 1 percent to about 10 percent titanium by weight of the braze material.

2. The protective covering of claim 1, wherein the substrate comprises a superalloy comprising iron, nickel, cobalt, or combinations thereof.

3. The protective covering of claim 1, wherein the substrate is a portion of a turbine blade.

4. The protective covering of claim 1, wherein the composite composition further comprises an abrasive material selected from the group consisting of boron nitride, silicon nitride, silicon oxynitride, silicon carbide, aluminum oxide, hafnium oxide, yttrium oxide, and combinations thereof.

5. The protective covering of claim 1, wherein the protective covering is present in the form of a sheet, a wafer, a wire, or a preform.

6. The protective covering of claim 1, wherein the protective covering is a free-standing component.

7. The protective covering of claim 1, having a thickness in a range from about 50 microns to about 1000 microns.

8. The protective covering of claim 1, having a density of at least about 85% of a theoretical density.

9. The protective covering of claim 1, wherein a thin reaction layer is present at an interface between the protective covering and the braze material.

10. The protective covering of claim 1, wherein position X comprises yttrium at a level from about 0.001 percent to about 0.2 percent by weight of the MCrAlX alloy; and the nano-oxide ceramic comprises alumina.

11. The protective covering of claim 1, wherein the nano-oxide ceramic comprises alumina, zirconia, hafnia, titania, tantala, terbia, ytterbia, dysprosia, or combinations thereof.

12. The protective covering of claim 1, wherein the nano-oxide ceramic comprises particles of an average particle size in a range from about 5 nanometers to about 200 nanometers.

* * * * *